United States Patent Office 3,741,873
Patented June 26, 1973

3,741,873
METHOD FOR THE STABILIZATION OF ALPHA-1,6-GLUCOSIDASES
Seinosuke Ueda, Fukuoka, and Koso Kato, Okayama, Japan, assignors to Hayashibara Company, Okayama, Japan
Filed Apr. 26, 1971, Ser. No. 137,296
Claims priority, application Japan, Apr. 24, 1970, 45/35,182
Int. Cl. C12d 13/10
U.S. Cl. 195—68   4 Claims

ABSTRACT OF THE DISCLOSURE

The method for increasing pH stability, thermal stability and optimal temperature of isoamylases (alpha-1,6-glucosidases) which are obtained from the cultivation of strains of the genuses Actinomycetes with the addition of calcium ions to said isoamylases.

---

The present invention relates to a method of improving the thermal stabilities, and expanding the ranges of thermal stability and improving the pH stabilities of isoamylase solutions prepared from the cultivation of Actinomycetes.

Generally the known enzymes that decompose the alpha-1,6-glucosidic bonds of starch include isoamylase produced by yeast, pullulanase produced by *Aerobacter aerogenes*, and R-enzymes obtained from botanical sources. The heat stabilities of such enzymes are relatively low, the optimal temperatures of effecting reaction being 30–50° C. At around 50° C. the inactivation rate of these enzymes during a prolonged period of reaction is substantially high. Accordingly, it is necessary to perform the decomposition reaction of starch at a temperature lower than 50° C. in order to prevent the inactivation. In this case the rate of reaction is slow, which eventually causes the prolongation of the reaction period. In addition the prolongation may effect contamination caused by other bacteria, which becomes a great obstacle in the industrial utilization of such enzymes.

The inventors studied the thermal and pH stabilities of various enzymes produced by a number of Actinomycetes strains. Cultures isolated by the inventors, such as Actinomycetes Nos. 250, 293, 734 and 657, were added a ⅔,₀₀₀ M solution of ethylene diamine tetra acetate (hereinafter abbreviated as EDTA). Thus the metal ions present in the mixture were blocked and then the activities of such treated enzymes were determined. The results showed that the activities of such treated enzymes were only 34.5% of those of the untreated enzymes.

On discovering the great effects of the addition of metal ions, the inventors studied the effects of the addition of $MgSO_4$, $CaCl_2$, $Ca(CH_3COO)_2$, $FeSO_4$, $ZnSO_4$, and $BaCl_2$ on the activities of enzymes.

Fractions were prepared by dialyzing the enezyme solutions with ¹⁄₁,₀₀₀ M EDTA for 24 hours, and to some fractions was added a variety of various metal ions to give concentrations of about 5 mM. The fractions, to which any variety of the metal ions was not added, were incubated at 40° C. and the added fractions at 50° C. for one hour, respectively. The results of determination of the residual enzymatic activities are listed in Table 1. As shown in the table, the enzymes to which were added $CaCl_2$ or $Ca(CH_3COO)_2$ exhibited residual enzymatic activties of nearly 100%, while the fractions, to which metal ions were not added, exhibited only 16%. In the fractions, to which any of the sulfates comprising $Cu^{++}$, $Z^{++}$, $Fe^{++}$ and $Mg^{++}$ was added, most of the activity was inactivated, showing residual activities of less than a few percent. Therefore cupric sulfate is conceived to possess a complete inhibitive action.

The optimum amount of metal salts to be added is about 5 mM., but it has been found that an activity of about 80% can still be obtained using a concentration of 0.5 mM. of metal salts. Thus concentrations up to about 5 mM. of metal salts are acceptable in the present invention.

TABLE 1.—THE EFFECTS OF METAL IONS ON ENZYMATIC ACTIVITIES

| Metal ions | Kept at 50° C. | | One hour treatment at 40° C. | | One hour treatment at 50° C. | |
|---|---|---|---|---|---|---|
| | Unit/ml. | Relative activity | Unit/ml. | Relative activity | Unit/ml. | Relative activity |
| $MgSO_4$ | 15.1 | 98.9 | 12.3 | 82.7 | 0.9 | 6.1 |
| $CaCl_2$ | 17.6 | 115.7 | 15.7 | 106.0 | 14.5 | 98.0 |
| $Ca(CH_3COO)_2$ | 15.6 | 102.0 | 14.2 | 95.6 | 14.8 | 100 |
| $FeSO_4$ | 13.2 | 86.4 | 11.1 | 75.0 | 0.3 | 2.1 |
| $ZnSO_4$ | 18.4 | 120.0 | 9.8 | 64.2 | 2.6 | 1.7 |
| $CuSO_4$ | 5.0 | 32.4 | 0.3 | 2.0 | 0 | 0 |
| $BaCl_2$ | 16.4 | 107.2 | 13.9 | 93.9 | 1.0 | 6.8 |
| Not added | 15.3 | 100 | 14.1 | 95.5 | 2.4 | 15.9 |
| Untreated | | | 14.8 | 100 | 14.8 | 100 |

On finding that the strains of Actinomycetes No. 250 and similar strains (their similarities) are particularly stabilized with the addition of calcium ions, the inventors compared the effects of the additions of 5 mM. calcium ions using calcium acetates to six typical solutions of enzymes obtained from isoamylase producing Actinomycetes strains, such as No. 250, *Streptomyces diastatochromogenes* IFO 3337, *Nocardia asteroides* IFO 3384, *Micromonospora melanosporea* IFO 12515, *Thermomonospora viridis* IFO 12207 and *Micromonospora echinospora* IFO 12574, which were dialyzed with EDTA and distilled water and then deionized beforehand. In order to determine the optimal temperatures for the reaction of the enzymes the rates of hydrolysis were compared at different temperatures for one hour using a 1% pullulan solution as a substrate. The results indicated that the optimal temperature for the enzyme of No. 250 strain, without the addition of calcium ions, was 50° C., and that the range was limited, whereas with the addition of calcium ions the optimal temperature elevated 5–10° C. to 50–60° C. showing an expansion of the range. On the other hand, after treating the enzymes with or without the addition of calcium ions at pH 5.5 and different temperatures for one hour, the thermal stabilities of the enzymes were observed by determining their hydrolysis rates obtained after an additional hour of treatment at 40° C. As shown in FIG. 4, most of the activties of the enzymes, to which calcium ions were not added, were inactivated, while the addition of calcium ions inactivated the enzymatic activities at 50–60° C., showing an elevation of about 10° C.

Other appropriate calcium ions rather than those aforesaid can be used for the puropse of the present invention.

Figure 1:
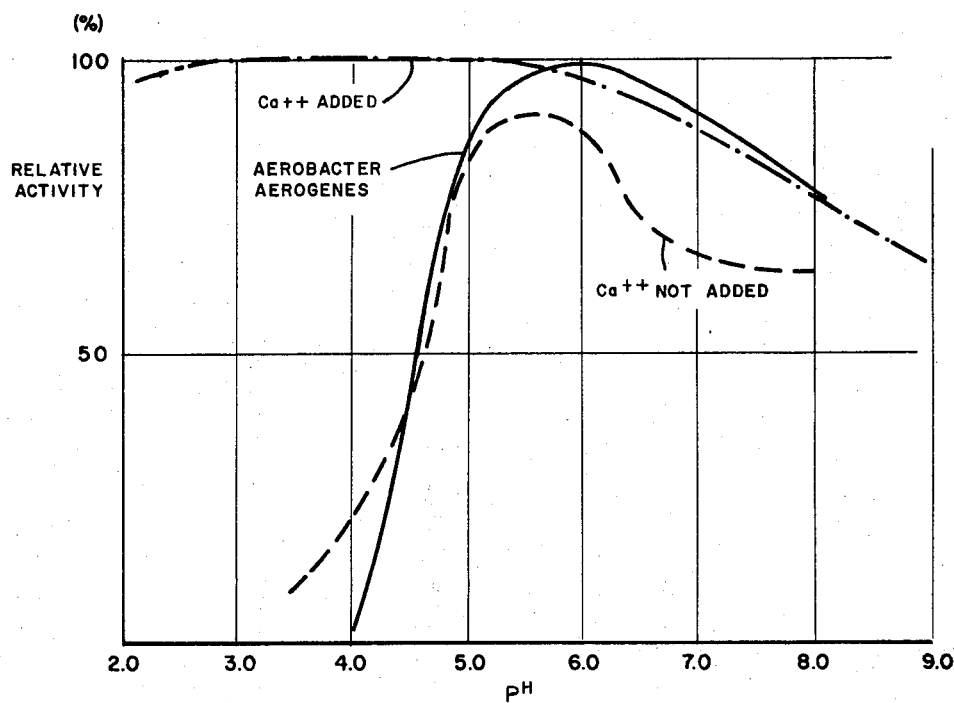
FIGS. 1 and 2 show the optimal pH and the variation of stabilties of the enzymes with added metal ions.
Figure 2:
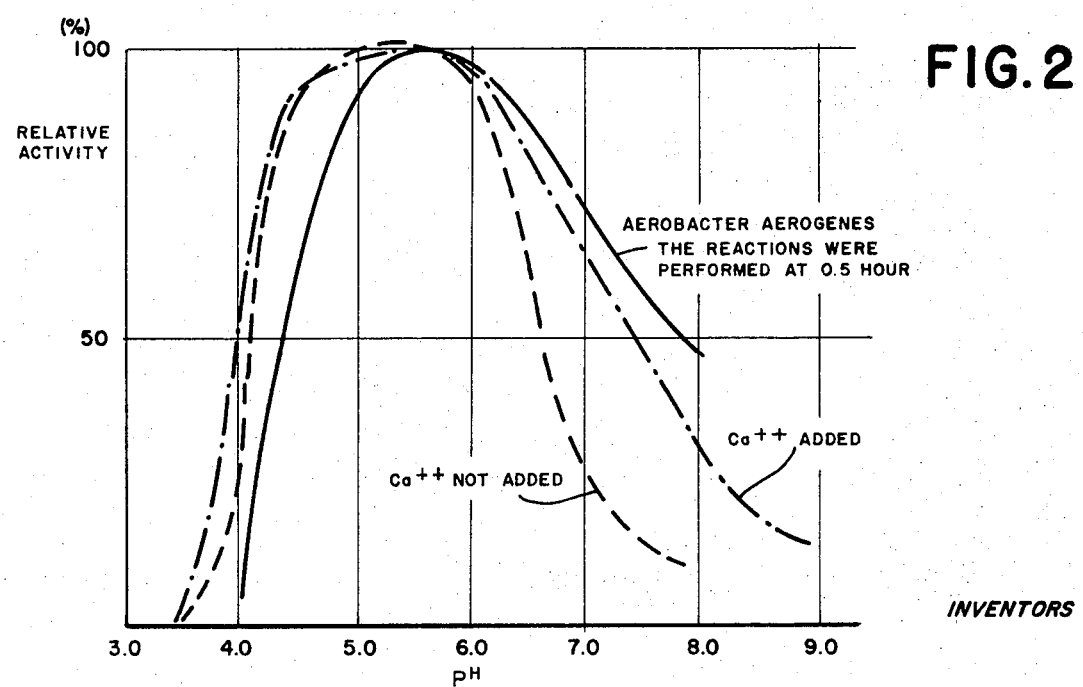

The inventors studied the pH stabilities by treating the enzyme solutions with and without the addition of calcium ions at different pH values at 30° C. for one hour, and determined the enzymatic activities. The results are illustrated in FIG. 1, showing that the maximum residual activity of 90% was elevated up to 100%, and simultaneously the addition of calcium ions expanded the pH stabilization range to about 5.0–6.0 as compared to the range of 2.0–6.0 as in the case of no addition of calcium ions. As shown in FIG. 2, no great variation was observed in the optimal pH.

Summarily, it was found that in the cases of Actinomycetes the addition of calcium ions elevates the pH stabilization about 10% and expands the stabilization range extensively. The addition of calcium ions was also found effective in stabilizing the activities of enzymes produced from the other five type cultures.

The present invention will be illustrated further with examples. All percentages and parts are given by weight unless stated otherwise.

The following examples, without limiting in any way the scope of the invention which we claim, are specific embodiments of the invention.

THE METHODS EMPLOYED FOR THE DETERMINATION OF ENZYMATIC ACTIVITIES

Reaction mixture:                                   Ml.
    1% pullulan _____ 1.0
    Buffer solution (pH 5.5, acetate buffer) _____ 0.5
    Enzyme solution _____ 0.5

The reactions were performed at 40° C. for one hour.

The 1% pullulan used in the example was the pullulan that was obtained from the cultivation, dissolved, and then dialyzed against distilled water in a refrigerator for two days.

The employed acetate buffer comprised M/10 sodium acetate and M/5 acetic acid, and pH 5.5. The employed enzyme solution was 0.5 ml. of the supernatant obtained by the centrifugation of the culture broth, and added to 2.0 ml. of buffer solution (pH 5.5).

0.5 ml. fractions of the reaction mixture were collected at the beginning of the reaction and one hour later, and then the reaction was discontinued by mixing the fractions in a cupric reagent solution described in the Somogyi-Nelson method. The Somogyi-Nelson method is described in J. Biol. Chem., 160, 61 (1945), and the special number of Kagaku-no-Ryoiki, 34, 27–30 (1958). In accordance with the method 0.5 ml. fractions of the reaction mixture were admixed to a mixed solution comprising 1 ml. of Cu solution and 0.5 ml. of water. The mixture was heated at 100° C. for 10 minutes in test tubes with uniformed diameters, the tops of each being covered with a glass ball. Subsequent to the heating the mixtures were cooled with running water for three minutes and then 5 ml. of water was added after an addition of 1 ml. of the Nelson reagent solution. At this point the precipitated pullulan was centrifuged at 3,000 r.p.m. for three minutes and the supernatant was determined by the colorimetric method at 520 m$\mu$. The results were expressed as the differences of optical density absorbancies between the reaction fractions collected prior to the reaction and one hour later. One isoamylase unit was defined as the increase of absorbancy of 0.100 by incubation at 40° C. for one hour.

EXPERIMENTAL

The following strains and culture medium were used for the incubation tests at the culture temperatures.

Strains:                                        Temperature, ° C.
    Streptomyces diastatochromagenes IFO 3337 ___ 30
    Nocardia asteroides IFO 3384 _____ 30
    Micromonospora melanosporea IFO 12515 ____ 30
    Thermomonospora viridis IFO 12207 _____ 45
    Micromonospora echinospora IFO 12574 _____ 30

Composition of the culture medium:              Percent
    Soluble starch _____ 2.0
    Yeast extract _____ 0.5
    Polypeptone _____ 1.5
    NaCl _____ 0.5
    $K_2HPO_4$ _____ 0.02
    $FeSO_4 \cdot 7H_2O$ _____ 0.002
    pH 7.0.

Each of the strains was inoculated on the medium sterilized beforehand. The mixtures were incubated for 72–96 hours with shaking and aeration, and the supernatants were used as enzyme solutions. The supernatants were then dialyzed against 1/1,000 M EDTA solution and then against water to remove the metal ions. Following the procedure calcium acetate was added to give final concentration degrees of 5 mM.

(a) The optimal temperatures and thermal stabilities

A mixture solution comprising 1% pullulan 1 ml., 0.2 M acetate buffer solution (pH 5.5) 0.5 ml. was admixed to 0.5 ml. of enzyme solution added 5 mM. calcium acetate. The mixture was incubated for one hour and then the hydrolysis rates of pullulan were determined according to the Somogyi-Nelson method by measuring the optical densities. The stabilities were compared by the relative activities in the presence of substrates. The result obtained with strains of No. 250 is given in Table 2.

Figure 3:
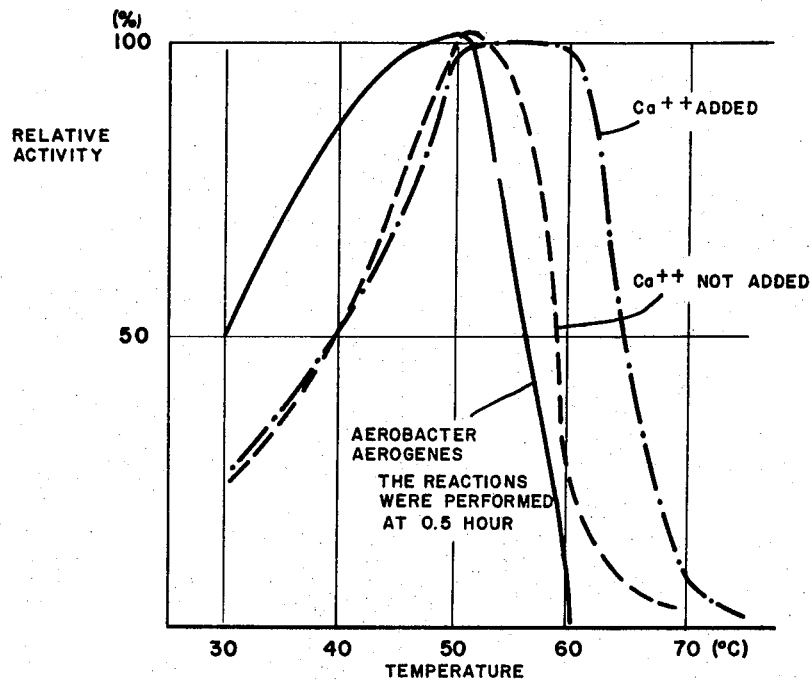
FIGS. 3 and 4 show the optimal temperatures and the variation of thermal stabilties of the enzymes with added metal ions.
Figure 4:
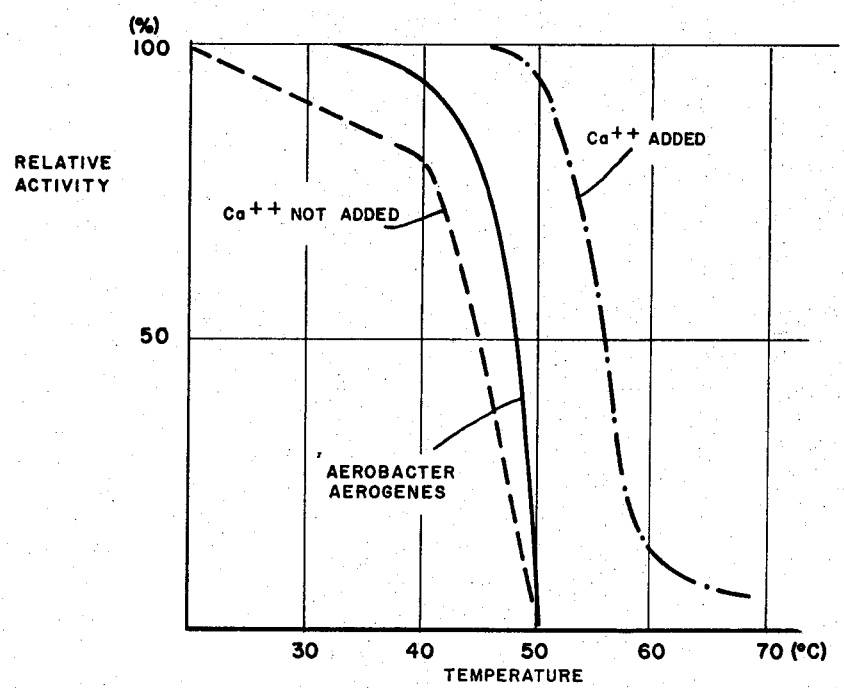

The values obtained under the same conditions were compared with those obtained with pullulanase from Aerobacter aerogenes sources in FIG. 3 and FIG. 4.

TABLE 2.—THE OPTIMAL TEMPERATURES FOR THE REACTION OF NO. 250 STRAINS

| Temperature (° C.) | Optical density | Optical density | Mean of optical density | Relative activity, percent |
|---|---|---|---|---|
| 30 | 0.158 | 0.152 | 0.155 | 26.8 |
| 35 | 0.216 | 0.216 | 0.216 | 37.3 |
| 40 | 0.310 | 0.300 | 0.305 | 52.6 |
| 45 | 0.420 | 0.395 | 0.408 | 70.5 |
| 50 | 0.574 | 0.562 | 0.568 | 98.2 |
| 55 | 0.593 | 0.565 | 0.569 | 100 |
| 60 | 0.562 | 0.575 | 0.569 | 98.3 |
| 65 | 0.210 | 0.224 | 0.217 | 37.5 |
| 70 | 0.036 | 0.046 | 0.041 | 6.9 |
| 75 | 0.020 | 0.013 | 0.017 | 2.9 |

As shown in Table 2, the strains of No. 250 exhibit their maximum thermal stability when pullulan is used as the substrate. The result was compared with those obtained by subjecting pullulan with enzymes without the addition of calcium ions and with pullulanase produced by Aerobacter aerogenes under the same conditions, respectively. The results of comparison illustrated in FIG. 3 show that the optimal temperature of the latter is 47–50° C., whereas the optimal temperature is elevated by the addition of calcium ions 10° C., which is a great attribute for the utilization in commercial production. In other words the prolonged enzyme reaction at lower than 50° C. effects contamination by other bacteria, which presents an essential problem in the subsequent procedures. However, the elevation of 10° C. of the reaction temperature prevents almost completely the contamination, and simultaneously accelerates the reaction rate, which all become attributes in shortening the reaction time and in diminishing the employable amount of enzymes.

Subsequently the thermal stabilities of enzymes were studied according to the following procedures. Enzyme solutions added 5 mM. of calcium ions were incubated at pH 5.5 and different temperatures for one hour. The reaction mixtures were cooled rapidly in an ice bath and then the enzymatic reaction was carried out at 40° C. for one hour. The residual enzyme activities were determined according to the usual method described by Somogyi and Nelson. As shown in Table 3, in the case of an absence of substrates the thermal stability exceeded 50° C. and the activity inactivated rapidly showing an almost complete inactivation at 60° C. However as shown in FIG. 4, the inactivation of enzymes to which calcium ions were not added began at 40° C. and was completed at 50° C. Thus the addition of calcium ions was found effective in elevating the thermal stability by 10° C.

TABLE 3.—THERMAL STABILITY OF ENZYMES

| Temperature (° C.) | Optical density | Optical density | Mean of optical density | Relative activity, percent |
|---|---|---|---|---|
| 30 | 0.294 | 0.284 | 0.289 | 99.5 |
| 35 | 0.300 | 0.314 | 0.307 | 105 |
| 40 | 0.295 | 0.280 | 0.288 | 99.0 |
| 45 | 0.250 | 0.262 | 0.256 | 88.0 |
| 50 | 0.285 | 0.285 | 0.285 | 96.5 |
| 55 | 0.180 | 0.176 | 0.178 | 61.2 |
| 60 | 0.030 | 0.035 | 0.033 | 11.7 |
| 65 | 0.020 | 0.020 | 0.020 | 6.9 |
| 70 | 0.010 | 0.016 | 0.013 | 4.5 |
| 75 | 0.012 | 0.010 | 0.011 | 3.8 |
| Untreated, 5° C | 0.290 | 0.291 | 0.291 | 100 |

No substantial difference was noticed in the optimal pH. The inventors studied the pH stabilities of the above strains of Actinomycetes which led to their findings that the maximum increase was 10% and the stability range was relatively stable at pH 3–7 exhibiting the same tendency.

Generally isoamylases (alpha-1,6-glucosidases) possess relatively low thermal stabilities and requires a reaction temperature lower than 45° C. As described in the examples with the addition of calcium ions elevation of the reaction temperature up to 50–60° C. as well as the expansion of the pH stability range are possible. Accordingly in the reaction at 60° C. the enzymatic activities are increased 5–7 times by the addition of $Ca^{++}$. Moreover TABLE 5.—pH STABILITIES OF ENZYMES

| pH | Optical density | Relative activity (percent) | pH | Optical density | Relative activity (percent) | pH | Optical density | Relative activity (percent) | pH | Optical density | Relative activity (percent) |
|---|---|---|---|---|---|---|---|---|---|---|---|
| 2.0 | 0.398 | 96.6 | 3.5 | 0.420 | 104 | 6.0 | 0.340 | 82.5 | 8.0 | 0.318 | 77.3 |
| 2.5 | 0.405 | 98.3 | 4.0 | 0.415 | 101 | 6.5 | 0.340 | 82.5 | 8.5 | 0.295 | 71.6 |
| 3.0 | 0.418 | 103 | 4.5 | 0.380 | 92.2 | 7.0 | 0.325 | 78.8 | 9.0 | 0.240 | 58.2 |
| 3.5 | 0.415 | 101 | 5.0 | 0.410 | 99.5 | 7.5 | 0.345 | 83.7 | 9.5 | 0.255 | 61.9 |
|  |  |  | 6.5 | 0.407 | 98.8 | 8.0 | 0.320 | 77.6 | 10.0 | 0.245 | 59.5 |
|  |  |  | 5.0 | 0.350 | 85.0 |  |  |  |  |  |  |

Similarly the optimal temperatures and thermal stabilities were tested on the five strains of the Actinomycetes group. As shown in the following table the results obtained were similar to those of strain No. 250, exhibiting the rise of 5–10° C. in the optimum temperatures and elevating the thermal stabilities similarly.

the possibilities of reducing the amount of enzyme to fractions and shortening the reaction time also to fractions are essential contributions from the view of commercial production.

We claim:

1. A method for increasing pH stability, thermal stabil-

|  | Optimal temperature (° C.) | | Thermal stability (percent) | | | |
|---|---|---|---|---|---|---|
|  | | | $Ca^{++}$ unadded at— | | $Ca^{++}$ added at— | |
| Strains | $Ca^{++}$ unadded | $Ca^{++}$ added | 35° C. | 50° C. | 50° C. | 60° C. |
| Streptomyces diastatochromogenes | 45–50 | 50–60 | 85 | 10 | 97 | 15 |
| Nocardia asteroides | 48–25 | 48–60 | 85 | 0 | 95 | 20 |
| Micromonospora melanosporea | 47–52 | 50–62 | 75 | 5 | 95 | 10 |
| Thermomonospora viridis | 47–50 | 50–60 | 80 | 10 | 97 | 10 |
| Micromonospora echinospora | 48–50 | 50–62 | 80 | 5 | 95 | 15 |

(b) The effects of $Ca^{++}$ on pH stabilities and optimal temperatures

The pH stabilities were determined by the following procedures. To the enzyme solutions were added 5 mM. of calcium acetate, treated one hour with the addition of buffer solutions (pH 2.0–10.0) at 30° C., the pH was adjusted to 5.5 with 1 N HCl and 1 N NaOH, and then equal amounts were determined by the above method on their activities.

The employed buffer solutions:

pH 2.0–3.5—0.2 M $CH_3COONa$—HCl
pH 3.5–6.0—0.2 M $CH_3COONa$—$CH_3COOH$
pH 6.0–8.0—0.2 M $Na_2HPO_4$—$NaH_2PO_4$
pH 8.0–10.0—0.1 M $H_3BO_3KCl$—$Na_2CO_3$

The above results indicate the dispensibility of special ities are increased at over pH 8.0, however, at a range of pH 2.5–5.5 the pH stabilities are substantially increased. The results obtained with using the enzyme solution added calcium ion and pullulanase derived from *Aerobacter aerogenes*, without the additions of calcium ions, as controls are illustrated in FIG. 1, which shows that the increase of the enzyme activities were over 10%, showing the same values obtained with pullulanase.

The above results indicate the dispensibility of special adjustment of pH with the addition of calcium ions in the case of enzymes with a pH of 3–7, which facilitates considerably the handling of enzymes during storage.

ity and optimal temperature of isoamylases (alpha-1,6-glucosidases) which are obtained from the cultivation of a strain of the genuses Actinomycetes comprising the addition of calcium ions to said isoamylases.

2. A process according to claim 1, wherein said calcium ion is selected from the group consisting of calcium acetate and calcium chloride.

3. A process according to claim 1, wherein the concentration of said calcium ion in solution of the alpha-1,6-glucosidases is about 5 mM.

4. A process in accordance with claim 1 wherein said strain is *Streptomyces diastatochromogenes*, IFO 3337, *Nocardia asteroides*, IFO 3384, *Micromonospora melanosporea*, IFO 12515, *Thermomonospora viridis*, IFO 12207, or *Micromonospora echinospora*, IFO 12574.

References Cited

UNITED STATES PATENTS 3,632,475  1/1972  Sugimoto et al. ----- 195—31 R
3,524,798  8/1970  Lloyd et al. --------- 195—63
3,634,266  1/1972  Theile et al. -------- 195—63 X

OTHER REFERENCES

Sakano et al.: Agricultural and Biological Chemistry, vol. 35, No. 6, pp. 971–973 (1971).

LIONEL M. SHAPIRO, Primary Examiner

U.S. Cl. X.R.

195—65

UNITED STATES PATENT OFFICE
CERTIFICATE OF CORRECTION

Patent No. 3,741,873          Dated June 26, 1973

Inventor(s) Seinosuke UEDA et al.

It is certified that error appears in the above-identified patent and that said Letters Patent are hereby corrected as shown below:

Columns 5 and 6, Table 5, second pH column, delete   "6.5"
               "5.0"
                   and insert

--5.5
                    6.0--

Columns 5 and 6, the table at line 34, under the first column delete "48-25" and insert --48-52--

Column 5, lines 63 and 64, delete "The above results indicate the dispensibility of specialities" and insert --The results, as shown in Table 5 indicate that the stabilities--

Signed and sealed this 27th day of November 1973.

(SEAL)
Attest:

EDWARD M. FLETCHER, JR.        RENE D. TEGTMEYER
Attesting Officer              Acting Commissioner of Patents